United States Patent [19]

Inoguchi et al.

[11] 4,434,117
[45] Feb. 28, 1984

[54] METHOD FOR PRODUCING A CORDIERITE BODY

[75] Inventors: Kazuhiro Inoguchi, Okazaki; Tomohiko Nakanishi, Kariya; Mitsuru Asano, Okazaki, all of Japan

[73] Assignee: Nippon Soken, Inc., Nishio, Japan

[21] Appl. No.: 250,150

[22] Filed: Apr. 2, 1981

[30] Foreign Application Priority Data

Apr. 4, 1980 [JP] Japan .................................. 55-45016
Apr. 4, 1980 [JP] Japan .................................. 55-45017

[51] Int. Cl.$^3$ .............................................. C04B 35/18
[52] U.S. Cl. ......................................... 264/56; 264/61
[58] Field of Search ................... 501/118, 119; 264/61, 264/209, 56

[56] References Cited

U.S. PATENT DOCUMENTS

| | | | |
|---|---|---|---|
| 3,885,977 | 5/1975 | Lachman | 501/118 |
| 3,954,672 | 5/1976 | Somers | 501/119 |
| 3,979,216 | 9/1976 | Fritsch | 501/119 |
| 4,001,028 | 1/1977 | Frost | 501/118 |
| 4,295,892 | 10/1981 | Matsuhisa | 501/119 |

OTHER PUBLICATIONS

Kingery, *Introduction to Ceramics*, P395, 1967.

*Primary Examiner*—John A. Parrish
*Attorney, Agent, or Firm*—Cushman, Darby & Cushman

[57] ABSTRACT

A method for producing a cordierite body having a lower coefficient of thermal expansion and excellent thermal shock resistance which comprises the steps of mixing and kneading a batch raw material containing plate-shaped talc particles and non-plate shaped particles of other ceramic material, anisostatically forming the mixed batch raw material so as to impart a planar orientation to the plate-shaped talc particles and drying and firing the obtained formed body. By firing the plate-shaped talc particles, the shrinkage of the cordierite body can be decreased.

11 Claims, 5 Drawing Figures

METHOD FOR PRODUCING A CORDIERITE BODY

BACKGROUND OF THE INVENTION

The present invention relates to a method for producing a cordierite body.

Cordierite ($2MgO.2Al_2O_3.5SiO_2$) has excellent low thermal expansion and is a suitable material to produce a product required to have thermal shock resistance when subjected to repeated cycles of rapid increases and decreases in temperature, for example a honeycomb structured catalyst support for purifying exhaust gas.

The coefficient of thermal expansion of cordierite has been generally known as $26.0 \times 10^{-7}/°C$. in the range of 25° to 1000° C.

Recently, various studies have been made to obtain a cordierite body having a more excellent thermal shock resistance. As a result, it has been found that by eliminating alkali metals such as sodium and potassium, alkaline-earth metals such as calcium and other impurities having an adverse effect on the low thermal expansion of cordierite, from the material, a cordierite body having a thermal expansion property as low as $17.0 \times 10^{-7}/°C$. in the range of 25° to 1000° C. can be obtained.

Furthermore, it has been reported that by orienting the anisotropic property of the cordierite crystals, cordierite bodies having coefficients of thermal expansion of less than $11.0 \times 10^{-7}/°C$. in the range of 25° to 1000° C. in at least one direction can be obtained.

For example, one of the methods for orienting the cordierite crystals to reduce the thermal expansion of the cordierite body in at least one direction is shown in U.S. Pat. No. 3,885,977.

In U.S. Pat. No. 3,885,977, it is stated that a cordierite body having a thermal expansion as low as $11.0 \times 10^{-7}/°C$. is obtained by forming a batch raw material containing plate-shaped particles, particularly kaolinite particles such as imparting a planar orientation to the plate-shaped particles, for example extrusion forming, drying and firing the obtained formed body.

One object of the present invention is to provide a cordierite body having a lower coefficient of thermal expansion in a specific direction compared with the conventional cordierite bodies.

Another object of the present invention is to provide a method for producing a cordierite body having the above described property with good productivity.

Still another object of the present invention is to provide a method for producing a cordierite body having the above described property without generating any shrinkage in the firing process.

Further object of the present invention is to provide a cordierite honeycomb structure having excellent thermal shock resistance, in particular to provide a honeycomb structure for use as a catalyst support for purifying exhaust gas of a vehicle.

DESCRIPTION OF THE DRAWINGS

Other objects and advantages of the invention will become apparent from the following description of embodiments with reference to the accompanying drawings wherein.

SUMMARY OF THE INVENTION

We inventors have made various studies and experiments to attain the above described objects. Consequently, we have successfully obtained a cordierite body exhibiting a low thermal expansion property in a specific direction of about $10.0 \times 10^{-7}/°C$. and $7.0 \times 10^{-7}/°C$. at the lowest in the temperature range from 25° to 1000° C. by anisostatically forming a batch raw material containing plate-shaped talc particles which were obtained by delaminating a talc stack along the (OOl) plane, by extruding or the like and drying and firing the obtained formed body.

The present inventors have also succeeded in substantially reducing the shrinkage of the cordierite body, which is generated in the firing process, by previously firing the above described plate-shaped talc particles before the forming, drying and firing processes as described above.

DETAILED DESCRIPTION OF THE INVENTION

One important point of the results of the study of the inventors is that the orientation of the plate-shaped talc particles within the formed body composed of the batch raw material determines the orientation of the c-axis of each crystal of the cordierite body which is obtained by firing the green body.

When talc ($3MgO.4SiO_2.H_2O$) is broken, it is generally delaminated along the (OOl) plane which is perpendicular to the c-crystal axis thereof, into plate-shaped particles.

When the batch raw material containing these plate-shaped talc particles is extruded by anisostatically forming, through an extrusion die provided with narrow slits, the plate-shaped talc particles 1 are broken down and are oriented in the plane along the surface of the obtained extruded formed body 2.

In the cordierite body obtained by firing the extruded formed body, the c-crystal axis of the cordierite body is oriented in the direction perpendicular to the c-axis of the original talc, namely in the direction along the surface of the wall of the cordierite body. The obtained cordierite body exhibits a very excellent low thermal expansion property in such a direction as described above.

According to the results of the study of the inventors, the talc particles contained within the batch raw material impart the above described orientation of the c-axis to the cordierite body. Materials other than talc, such as silica, kaolin and aluminum hydroxide or alumina need not be in a plate-shape. They need not be oriented in the extruding process. Preferably they are shaped into equilateral particles of a smaller diameter than that of talc particles.

If plate-shaped or large-sized particles of materials other than talc are contained within the batch raw material, they obstruct the orientation of the plate-shaped talc particles in the extruding process.

When the batch raw material containing plate-shaped talc particles is used, the obtained cordierite body has the above described orientation of the c-axis, even if kaolinite is not contained therewithin.

Figure 1:
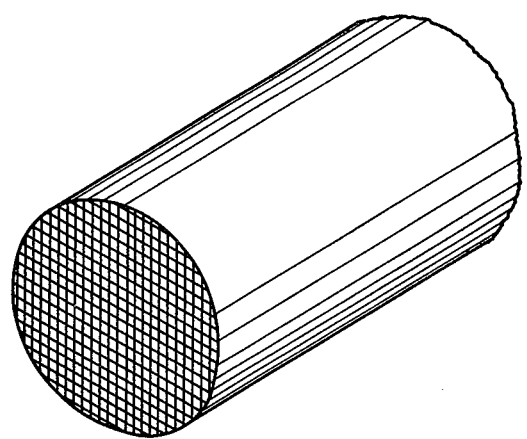
FIG. 1 is a perspective view of a honeycomb structure for use as a catalyst support for purifying exhaust gas of a vehicle.
Figure 2:
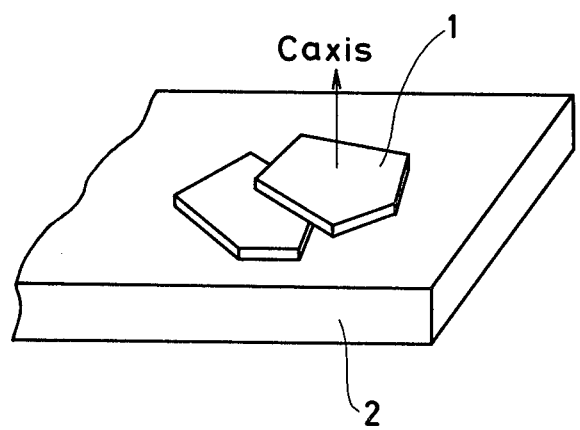
FIG. 2 is a view showing the orientation of the plate-shaped talc particles within a slurry in the extruding process.

Since the cordierite body obtained by the method of the present invention has the above described property, it can be effectively used as a honeycomb structure catalyst support for exhaust gas, provided with a large number of axially extending open holes surrounded by thin walls, as shown in FIG. 1.

The honeycomb structure having the above described construction is generally extruded by means of an extrusion die provided with narrow slits.

When the batch raw material of the present invention passes through the narrow slits of the extrusion die, the plate-shaped talc particles contained within the batch raw material are oriented in the plane along the surface of the wall of the extruded honeycomb structure and to the obtained catalyst support, an orientation of the c-axis along the surface of the wall thereof is imparted.

Therefore, the obtained catalyst support has an excellent low thermal expansion property in the direction along the surface of the wall thereof.

Against an abrupt temperature change, damages and cracks are scarcely observed in the above-described catalyst support. Thus, the catalyst support exhibits excellent thermal shock resistance.

The coefficient of thermal expansion of the catalyst support in the direction of the wall thickness is larger than that in the direction along the surface of the wall. But, since the wall thickness of the honeycomb structure is very thin and is between opposed wall portions, there are open holes which allow for expansion in the direction of the wall thickness, and thus the honeycomb structured catalyst support is not in danger of being broken or cracked.

Furthermore, the present invention is profitable in that the talc is generally delaminated along the (OOl) plane into plate-shaped particles when it is pulverized.

According to the present invention orientation of the c-axis can be imparted to the cordierite body by using plate-shaped talc particles as the batch raw material. Therefore, the method of the present invention is also profitable from the viewpoint of productivity.

Another important point of the results of the study of the inventors is that the shrinkage of the cordierite body can be minimized in the firing process, by using previously fired plate-shaped talc particles such as the talc particles contained within the batch raw material.

In order to obtain the prefired talc added to the batch raw material, it is necessary to pulverize the talc into plate-shaped particles before the previous firing process.

If the talc is pulverized into plate-shaped particles after being previously fired, the obtained talc particles are not shaped into a plate-like form but rather an equilateral form so that the planar orientation cannot be imparted to the prefired talc in the extruding process. When the talc is fired, enstatite mineral ($MgO.SiO_2$) is formed within the structure of the prefired talc. Enstatite mineral is not delaminated in a specific direction but generally pulverized into equilateral particles so that the prefired talc is not pulverized into plate-shaped particles.

Talc contains water and is a thermally unstable material. When the batch raw material containing water is fired, the obtained cordierite body shrinks due to the disappearance of water. Within the structure of the obtained cordierite body, strain is produced due to the shrinkage thereof.

According to the present invention, by eliminating water from the batch raw material and by using thermally stable prefired talc, the shrinkage of the obtained cordierite body can be decreased and the crystallinity thereof is good.

The previously firing temperature preferably ranges from 900° to 1400° C. In particular, the temperature range from 1100° to 1300° C. is most preferable. Under 900° C., the water contained within the talc scarely or partially disappears in the previously firing process and a thermally unstable component remains therein so that a low shrinkage rate and excellent crystallinity cannot be obtained.

And at about 1400° C. or more, the plate-shaped talc particles are sintered with one another so that the plate-shaped form thereof cannot be maintained.

Preferably the firing temperature of the extrusion formed body is 1340° C. to 1460° C.

Hereinafter, several experiments using the batch raw materials containing plate-shaped talc particles will be explained.

EXPERIMENT 1

Materials having the chemical composition as shown in Table 1 respectively were mixed together in the mixing ratio (weight %) as shown in Experiments A to L of Table 2, then binders and water were added to the mixed materials. After being kneaded, the obtained batch raw material was extruded by means of an extrusion die for forming a honeycomb structure having a slit width of 0.30 mm and a cell number of 300 per square inch.

After being dried, the obtained extruded body was fired at a temperature of 1400° C. at the maximum for 5 hours and a cordierite body of high purity, containing not less than 95 weight % of crystal, was obtained.

From the obtained cordierite body, samples having a diameter of 10 mm and a length of 50 mm respectively were cut and the coefficient of thermal expansion was examined in the direction parallel with the extruding direction (namely, the direction along the surface of the wall of each cordierite body and perpendicular to the direction of the wall thickness) at 25° to 1000° C.

The raw talc which was used in this experiment, is shaped like plate-shaped particles which were delaminated along (OOl) plane by a dry pulverizing method.

Other materials than raw talc were not shaped into pulverized plate-shaped particles. In Table 1, Ig loss shows ignition loss.

The result of the examination is shown in Table 2. From this result, it is clear that the cordierite body exhibits a very excellent low coefficient of thermal expansion in the direction parallel with the extruding direction.

The cordierite body obtained in this experiment is a hexagonal crystalline body. It is well known that the hexagonal crystalline cordierite body has an anisotropic property with regard to the thermal expansion and that the coefficient of thermal expansion in the c-axis direction is particularly low. However, usual cordierite bodies do not exhibit the anisotropic property of thermal expansion since the c-crystal axes thereof extend in directions such as that along the surface of the wall of the cordierite body and that of the wall thickness.

From the experiment results described above, it is clear that the orienting property in the direction along the surface of the wall is imparted to the c-axis of all crystals of the cordierite body which was obtained by extruding the slurry containing the plate-shaped talc and firing the extruded slurry so that a low thermal expansion property is obtained in the direction along the surface of the wall.

EXPERIMENT 2

Materials having the same composition ratio as shown in Experiment A of Table 2 respectively were mixed. In this case, the average diameter of the talc particles was changed from 2.8 to 30μ.

Then, the mixed materials were extruded, dried and fired in the same manner as described in Experiment 1 to form honeycomb structures.

And the coefficients of thermal expansion were examined on the samples which were cut from the obtained honeycomb structures in the direction parallel with the extruding direction.

Figure 3:
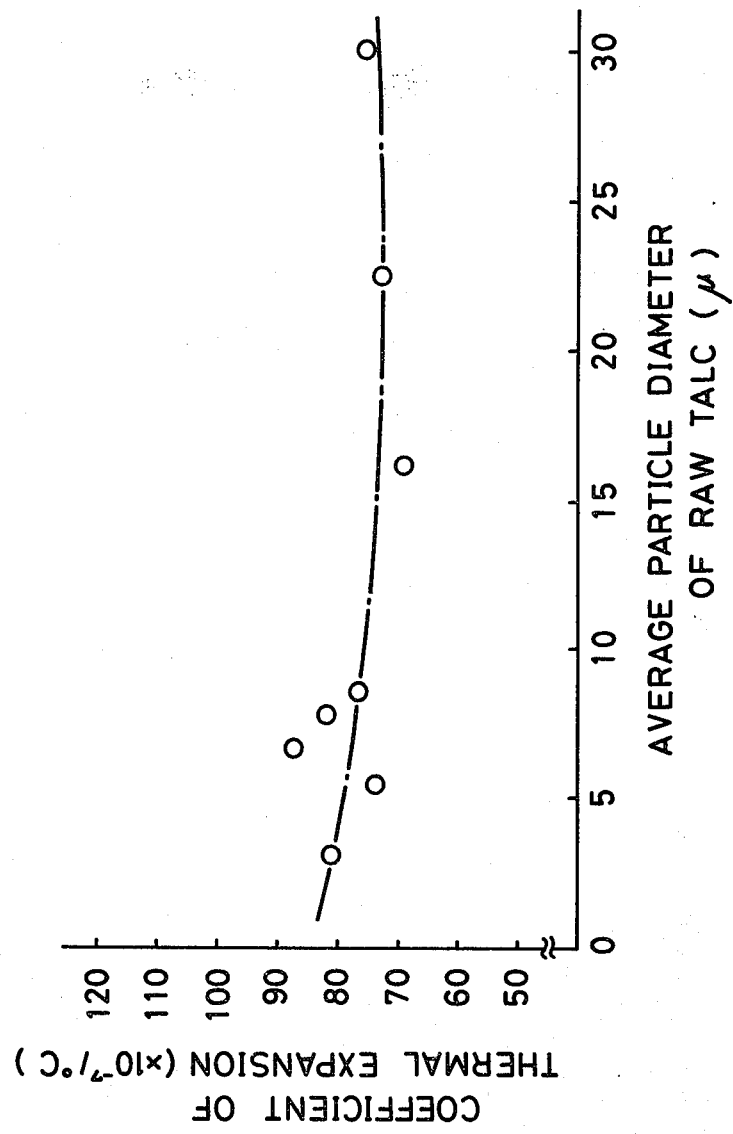
FIG. 3 to FIG. 5 are views showing experimental results of the properties of the cordierite bodies which are obtained by the method of the present invention and the conventional cordierite bodies, respectively.

The experimental result is shown in Table 3 and FIG. 3.

The coefficient of thermal expansion is distributed Within the range from $6.9 \times 10^{-7}/°C$ to $8.8 \times 10^{-7}/°C$ regardless of the sharp change of the diameter of the talc particles. Thus, the coefficient of thermal expansion of the cordierite body obtained by the present invention is very low and is not substantially changed.

Therefore, according to the present invention, it is clear that the severe adjustment of the particle size of the raw talc is not required for obtaining a cordierite body having a thermal expansion property.

EXPERIMENT 3

Materials having the composition shown in Experiment A of Table 2 were mixed and kneaded together with water and binders. Then the mixed materials were extruded like a sheet by means of an extrusion die provided with slits of an oblong section of 50 mm long by 3 mm wide.

The X-ray diffraction of the obtained samples was carried out and the coefficient of thermal expansion of each samples was examined.

The X-ray diffraction was carried out after the samples were dried, but before the samples were fired.

The coefficient of thermal expansion ($\times 10^{-7}/°C$) was examined after each sample was fired at a temperature up to 1400° C. for 5 hours.

The X-ray diffraction was examined according to the diffraction line of the raw talc. The result is shown in Table 4.

In Table 4, the X-ray intensity ratio in the direction of the wall thickness of the sample is set to 100 and those in other directions are indicated on the basis of the direction of the wall thickness.

From the above described result, it is clear that almost all plate-shaped talc particles are oriented in the plane of the sheet surface which is parallel with and perpendicular to the extruding direction of the extruded sample, that the lower thermal expansion property is observed in the direction along the sheet surface of the fired body, namely, the c-crystal axis of the cordierite contained within the fired body is oriented in the direction along the sheet surface of the fired body; and that the c-axis which is perpendicular to the (OOl) plane, of the original talc meets at right angles with the c-axis of the cordierite fired body.

Furthermore, the experiment using non-plate-shaped kaolin in place of silica contained within the batch raw material, was carried out. Consequently, substantially same result as described above was obtained.

As described above, the c-axis of the cordierite body can also be oriented by using the batch raw material which does not contain kaolin or one which contains kaolin in a shape not oriented in the extruding process. From the above fact, it is clarified that kaolin is not involved in the orientation of the c-axis of the cordierite body.

Hereinafter, several experiments using the batch raw material containing prefired plate-shaped talc particles, will be explained.

Table 5 shows materials which were used in the following experiments. But in the following experiments, all of the materials shown in Table 5 are not used at the same time. In each experiment, the composition ratio by weight of the materials was regulated in order to satisfy the condition of $SiO_2:Al_2O_3:MgO = 51.4:34.9:13.7$. The raw talc and the prefired talc were pulverized by the dry pulverizing method. An experimental die for forming a honeycomb structure having a large number of slits of 0.3 mm in width with a cell density of 300 cells per square inch was used as the extruding die. The firing process after the extruding process was carried out was at a temperature up to 1400° C. for five hours.

EXPERIMENT 4

The prefired talc, silica ($SiO_2$) and aluminum hydroxide [$Al(OH)_3$] as shown in Table 5 were used. These materials were mixed and kneaded together with water and binders. The obtained slurry was extruded by the experimental die, dried and fired. Consequently, a honeycomb structure was obtained.

The prefired talc was prepared by pulverizing layered raw talc to be delaminated along the (OOl) plane into plate-shaped particles and firing the obtained plate-shaped talc particles (hereinafter this will be called "the prefired talc according to the present invention"). Another prefired talc was prepared by previously firing raw talc having an average particle diameter of 30μ and pulverizing the obtained prefired talc having an average particle diameter of 28μ (hereinafter this will be called "the comparative prefired talc"). The experiment using two kinds of prefired talc having various average particle diameters was carried out. In Table 5, Ig loss shows ignition loss.

The average diameters of each prefired talc and the results of the examination of the thermal expansion property in the axial direction of the obtained honeycomb structure (namely, in the direction parallel with the extruding direction or along the surface of the wall of the honeycomb structure) in the temperature range from 25° to 1000° C. are shown in Table 6.

An examination was carried out on samples of 10 mm in diameter and 50 mm in length which were cut from the obtained honeycomb structure.

In Table 6, the prefired talc (a) designates the above described prefired talc according to the present invention and the prefired talc (b) shows the above described comparative prefired talc. CTE designates the coefficient of thermal expansion ($\times 10^{-7}/°C$. Experiment 4 designates this experiment; Experiment 5 which will be explained later.

Figure 4:
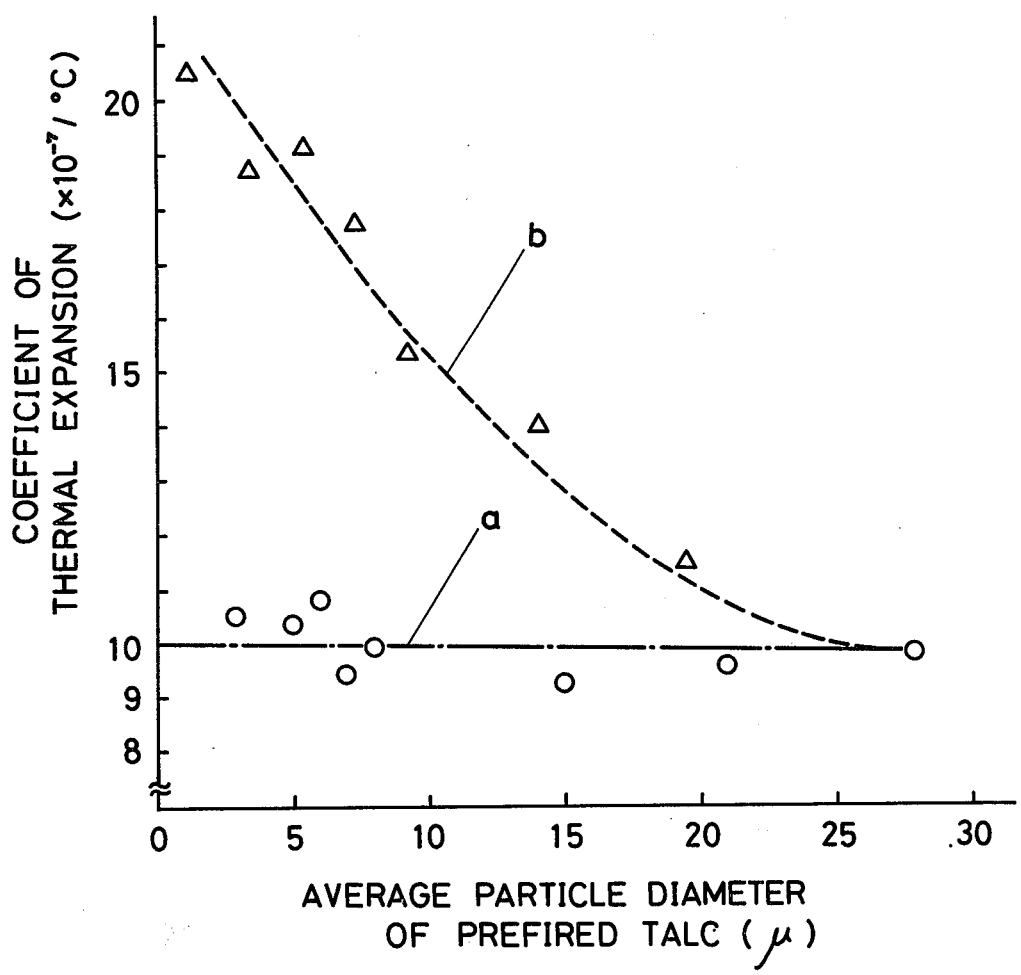

FIG. 4 shows the result of Experiment 4. In FIG. 4, marks O and a line a show the result of the prefired talc (a) and marks Δ and a line b show the result of the prefired talc (b).

As is apparent from FIG. 4, the honeycomb cordierite bodies obtained according to the present invention have excellent low and substantially uniform coefficients of thermal expansion ranging from 9.3 to 10.8×10⁻⁷/°C., regardless of the average particle diameter of the prefired talc.

In contrast, the cordierite bodies using the comparative prefired talc have a much larger coefficient of thermal expansion than that of the prefired talc according to the present invention.

The prefired talc (b) having an average particle diameter of 28μ is not subjected to the pulverizing process after the previously firing process. Therefore, the obtained data is the same as that of the prefired talc (a) according to the present invention.

The coefficient of thermal expansion of the prefired talc (b) is increased as the average diameter thereof is minimized since as the average diameter of the prefired talc (b) is minimized, the plate-shaped talc particles are further pulverized into non-plate-shaped particles so that the orientation of the talc cannot be obtained.

EXPERIMENT 5

Figure 5:
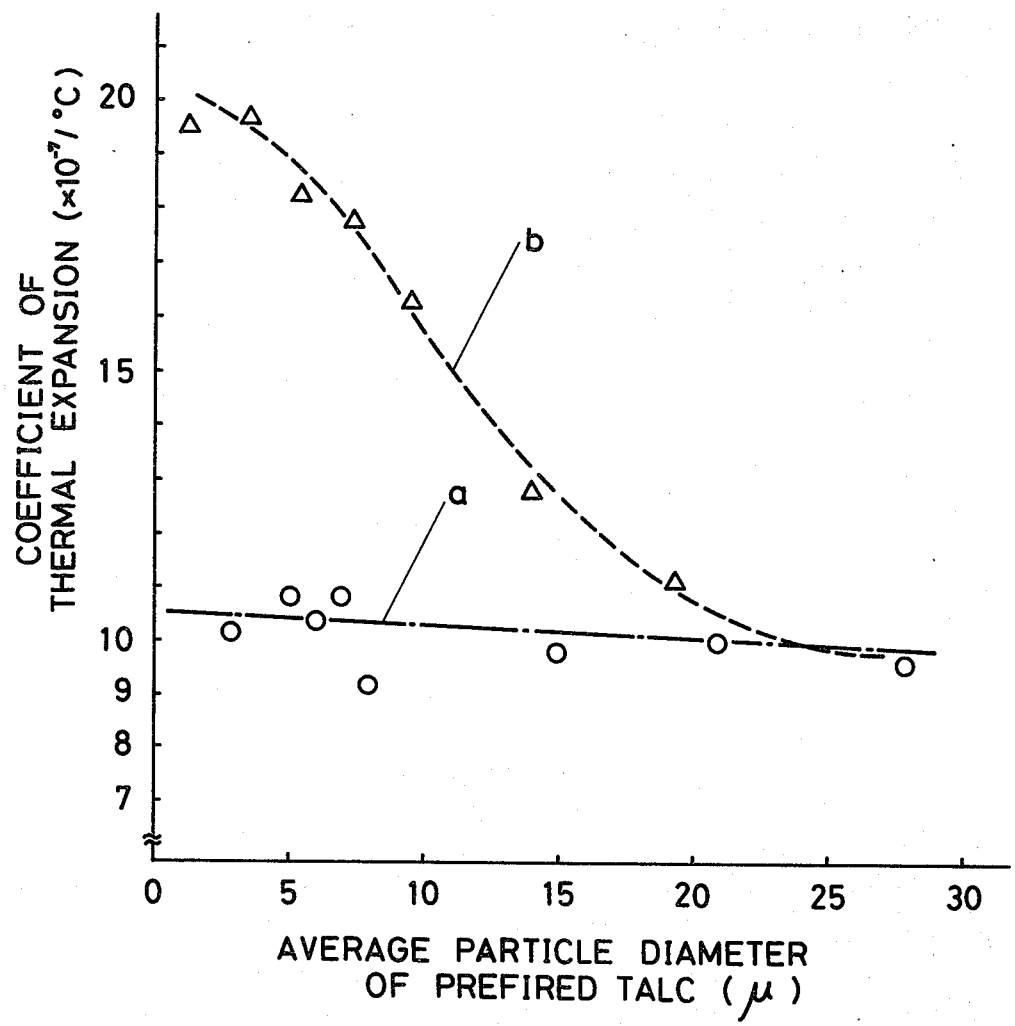

Pulverized plate-shaped kaolin was used in place of silica which was one of the materials of Experiment 4. The other materials were the same as those of Experiment 4. The same experiment as Experiment 4 was carried out. The experimental results are shown in Table 6 and FIG. 5.

The honeycomb structured cordierite bodies obtained according to the present invention have low coefficients of thermal expansion ranging from 9.2 to 10.8×10⁻⁷/°C. In contrast, the cordierite bodies using the comparative prefired talc have much larger coefficients of thermal expansion.

From Experiments 4 and 5, by using plate-shaped prefired talc, a low thermal expansion property can be obtained whether the kaolin is contained within the batch raw material or not.

Therefore, it is recognized that kaolin does not contribute to the orientation of the low thermal expansion c-axis of the cordierite body.

EXPERIMENT 6

From the batch raw material containing the prefired talc having an average particle diameter of 28μ, silica, aluminum hydroxide in the composition ratio shown in Table 5, a honeycomb structured cordierite body was produced by the same method as that of Experiment 4.

For comparison, from the batch raw material containing raw talc, silica, aluminum hydroxide in the composition ratio shown in Table 5, a honeycomb structured cordierite body was similarly produced. The firing shrinkage rate of each cordierite body was examined. In this case, the shrinkage rate is calculated as follows:

Firing shrinkage rate =

$$\frac{\text{size after being dried} - \text{size after being fired}}{\text{size after being dried}}$$

The firing shrinkage rate of the cordierite body using the prefired talc was 0.16% and that of the comparative cordierite body using raw talc was 1.72%.

EXPERIMENT 7

From the batch raw material containing the prefired talc having an average diameter of 28μ, plate-shaped kaolinite, and aluminum hydroxide in the composition ratio shown in Table 5, a cordierite body was produced by the same method as that of Experiment 4.

For comparison, from the batch raw material containing raw talc, plate-shaped kaolin, aluminum hydroxide in the composition ratio shown in Table 5, a cordierite body was similarly produced.

The firing shrinkage rate of the cordierite body of the present invention was 1.86% and that of the comparative cordierite body was 3.04%.

As is apparent from Experiments 6 and 7, by using the prefired talc, shrinkage occurring in the firing process can be decreased and a honeycomb structured product of high dimensional accuracy and excellent crystallinity can be produced compared with the case where the raw talc is used.

TABLE 1

| Composition | Material | | | | | |
|---|---|---|---|---|---|---|
| | Raw Talc | Kaolin | Silica (a) | Silica (b) | Aluminum hydroxide | Alumina |
| SiO₂ | 63.00 | 47.35 | 99.80 | 93.25 | 0.02 | 0.02 |
| Al₂O₃ | 0.10 | 37.48 | 0.04 | — | 65.13 | 99.50 |
| MgO | 31.70 | 0.02 | — | — | — | — |
| Fe₂O₃ | 0.03 | 0.18 | — | — | 0.01 | 0.01 |
| TiO₂ | — | 0.28 | 0.02 | — | — | — |
| CaO | 0.03 | 0.10 | — | — | — | — |
| K₂O | — | 0.08 | — | — | 0.43 | 0.43 |
| Na₂O | — | 0.08 | — | 0.10 | — | — |
| Ig loss | 4.58 | 13.89 | — | 6.00 | 34.45 | — |
| Average Particle Diameter | 22.4μ | 6.3μ | 12 mμ | 1.5μ | 1.2μ | 1.0μ |

TABLE 2

| Experiment | A | B | C | D | E | F |
|---|---|---|---|---|---|---|
| Composition Ratio | | | | | | |
| Raw Talc | 35.7 | 42.2 | 39.4 | 35.2 | 41.5 | 38.8 |
| Silica (a) | 20.0 | 23.6 | 22.0 | — | — | — |
| Silica (b) | — | — | — | 21.1 | 24.9 | 23.2 |
| Kaolin | — | — | — | — | — | — |
| Aluminum hydroxide | 44.3 | — | 19.3 | 43.7 | — | 19.0 |
| Alumina | — | 34.2 | 19.3 | — | 33.6 | 19.0 |
| Coefficient of Thermal Expansion (×10⁻⁷/°C.) | 7.3 | 8.5 | 7.8 | 9.9 | 11.2 | — |

| Experiment | G | H | I | J | K | L |
|---|---|---|---|---|---|---|
| Composition Ratio | | | | | | |
| Raw Talc | 36.5 | 39.3 | 38.1 | 35.5 | 41.9 | 39.1 |
| Silica (a) | — | — | — | 10.3 | 12.1 | 11.3 |
| Silica (b) | — | — | — | 10.3 | 12.1 | 11.3 |
| Kaolin | 43.1 | 46.4 | 45.0 | — | — | — |
| Aluminum hydroxide | 20.4 | — | 8.5 | 43.9 | — | 19.2 |
| Alumina | — | 14.4 | 8.4 | — | 33.9 | 19.1 |
| Coefficient of Thermal Expansion (×10⁻⁷/°C.) | 7.4 | 8.3 | 7.7 | 8.3 | 9.4 | 8.8 |

TABLE 3

| Average Particle Diameter of Raw Talc | 2.8 | 5.4 | 6.6 | 7.8 | 8.5 | 16.2 | 22.4 | 30.0 |
|---|---|---|---|---|---|---|---|---|

TABLE 3-continued

| Coefficient of Thermal Expansion ($\times 10^{-7}/°C$.) | 8.1 | 7.4 | 8.8 | 8.2 | 7.7 | 6.9 | 7.3 | 7.6 |
|---|---|---|---|---|---|---|---|---|

TABLE 4

| Examining Item | Direction | | |
|---|---|---|---|
| | Direction Parallel with Extruding Direction | Direction Perpendicular to Extruding Direction | Direction of Wall Thickness |
| X-ray intensity ratio of (001) plane of Talc | 11 | 23 | 100 |
| Coefficient of Thermal Expansion of Samples ($\times 10^{-7}/°C$.) | 7.2 | 9.1 | 20.3 |

TABLE 5

| Composition | Raw Talc | Prefired Talc | Silica | Aluminum hydroxide | kaolin |
|---|---|---|---|---|---|
| $SiO_2$ | 63.00 | 66.05 | 99.80 | 0.02 | 49.30 |
| $Al_2O_3$ | 0.10 | 0.10 | 0.04 | 65.13 | 36.00 |
| MgO | 31.70 | 33.23 | — | — | 0.08 |
| $Fe_2O_3$ | 0.03 | 0.03 | — | 0.01 | 0.28 |
| $TiO_2$ | — | — | 0.02 | — | 1.76 |
| CaO | 0.03 | 0.03 | — | — | 0.04 |
| $K_2O$ | — | — | — | 0.43 | 0.01 |
| $Na_2O$ | — | — | — | — | 0.03 |
| Ig loss | 4.58 | — | — | 34.45 | 13.25 |
| Average Particle Diameter | 30μ | 1.3 ~ 28μ | 12 mμ | 1.2μ | 2.6μ |

TABLE 6

| Prefired Talc (a) CTE | 28.0 | 21.0 | 15.0 | 7.9 | 7.0 | 6.2 | 5.1 | 2.8 |
|---|---|---|---|---|---|---|---|---|
| Experiment 4 | 9.8 | 9.6 | 9.3 | 10.0 | 9.4 | 10.8 | 10.4 | 10.5 |
| Experiment 5 | 9.6 | 10.0 | 9.8 | 9.2 | 10.8 | 10.4 | 10.8 | 10.2 |
| Prefired Talc (b) CTE | 28.0 | 19.4 | 14.0 | 9.3 | 7.2 | 5.4 | 3.5 | 1.2 |
| Experiment 4 | 9.8 | 11.5 | 14.0 | 15.3 | 17.6 | 19.1 | 18.6 | 20.4 |
| Experiment 5 | 9.6 | 11.2 | 12.8 | 16.2 | 17.7 | 18.2 | 19.6 | 19.5 |

Having fully described the invention, it will be apparent to one of ordinary skill in the art that many changes and modifications can be made thereto without departing from the spirit or scope of the invention as set forth herein.

What is claimed is:

1. A method for producing a body consisting substantially completely of polycrystalline sintered cordierite said method comprising the successive steps of:
   (a) delaminating a talc stack along the (001) plane thereof into plate-shaped talc particles, each particle having an average particle diameter of about 2.8 to about 30 microns;
   (b) firing the so obtained plate-shaped talc particles;
   (c) mixing and kneading a batch raw material containing the fired plate-shaped talc particles produced in step (b) together with non-plate-shaped particles of another ceramic material selected from the group consisting of aluminum hydroxide, alumina, silica and kaolin and preparing a slurry, provided that the particles of said other ceramic material have an average diameter smaller than that of the fired plate-shaped talc particles;
   (d) anisostatically forming the slurry into a formed body having a predetermined shape while imparting a planar orientation to the plate-shaped talc particles; and thereafter
   (e) drying and firing the thus formed body.

2. The method according to claim 1 wherein the slurry is formed in step (d) by extrusion through an extrusion die provided with at least one narrow slit.

3. The method according to claim 2 wherein the slurry is formed into a honeycomb structure by an extrusion die having a large number of narrow slits surrounded by thin walls.

4. The method according to claim 1 wherein the firing of step (e) is conducted at a temperature of about 1340° C. to about 1460° C.

5. The method according to claim 1 wherein the plate-shaped talc particles are fired in step (b) at a temperature of about 900° C. to about 1400° C.

6. The method according to claim 1 or 5 wherein the resulting cordierite body exhibits a substantially uniform coefficient of thermal expansion which is independent of the average particle size of the prefired talc.

7. A method for producing bodies consisting substantially completely of polycrystalline sintered cordierite each body so produced consistently exhibiting a substantially uniform coefficient of thermal expansion, said process consisting essentially of the sequential steps of:
   (1) delaminating a talc stack along the (001) plane thereof into plate-shaped talc particles, each particle having an average particle diameter of about 2.8 to about 30 microns; and thereafter;
   (2) firing the delaminated talc particles;
   (3) preparing a batch of raw material comprising mixing and kneading together (a) the fired plate-shaped particles produced in step (1), (b) non-plate shaped particles of another ceramic material selected from aluminum hydroxide, alumina, silica and kaolin, and (c)/water thereby producing a slurry provided that the particles of said other ceramic material (b) have an average diameter smaller than that of the fired plate-shaped talc particles (a);
   (4) anisostatically forming the slurry into a formed body having a predetermined shape while imparting a planar orientation to the plate-shaped talc particles; and finally
   (5) drying, and then firing the thus formed cordierite body.

8. The method according to claim 7 in which the resulting cordierite body exhibits a coefficient of thermal expansion from about 9.2 to about $10.8 \times 10^{-7}/°C$. and is independent of the average particle size of the prefired talc.

9. The method according to claim 7 in which the coefficient of thermal expansion ranges from about 9.3 to about $10.8 \times 10^{-7}/°C$.

10. The method according to claim 7 in which the coefficient of thermal expansion ranges from about 9.2 to about $10.8 \times 10^{-7}/°C$.

11. The method according to claim 8, 9, or 10 wherein the delaminated plate-shaped talc particles are fired in step (2) at a temperature of about 900° C. to about 1400° C. and the final product is fired in step (5) at about 1340° to about 1460° C.

* * * * *